United States Patent
He et al.

[11] Patent Number: 6,031,739
[45] Date of Patent: Feb. 29, 2000

[54] TWO-STAGE, THREE-PHASE SPLIT BOOST CONVERTER WITH REDUCED TOTAL HARMONIC DISTORTION

[75] Inventors: Jin He, Plano; Mark E. Jacobs, Dallas, both of Tex.

[73] Assignee: Lucent Technologies Inc., Murray Hill, N.J.

[21] Appl. No.: 09/133,068

[22] Filed: Aug. 12, 1998

[51] Int. Cl.$^7$ .................................................. G05F 1/613
[52] U.S. Cl. .............................. 363/44; 363/89; 323/222
[58] Field of Search ........................ 363/44, 89, 126; 323/222

[56] References Cited

U.S. PATENT DOCUMENTS

| | | | |
|---|---|---|---|
| 5,414,613 | 5/1995 | Chen | 363/89 |
| 5,446,646 | 8/1995 | Miyazaki | 363/89 |
| 5,506,766 | 4/1996 | Takahashi | 363/89 |
| 5,654,882 | 8/1997 | Kanazawa et al. | 363/89 |
| 5,764,037 | 6/1998 | Jacobs et al. | 323/222 |
| 5,793,625 | 8/1998 | Balogh | 323/222 |
| 5,886,891 | 3/1999 | Jiang et al. | 363/89 |

OTHER PUBLICATIONS

M.E. Jacobs, et al. "An Improved High Efficiency Rectifier for Telecom Applications", Apr. 1996 IEEE INTELEC Conference Proceedings, pp. 530–535.

A.R. Prasad, P.D. Ziogas, and S. Manias, "An Active Power Factor Correction Technique for Three–Phase Diode Rectifiers", Sep. 1989 IEEE PESC Proceedings, pp. 58–66.

R. Zhang & F.C. Lee, "Optimum PWM Pattern for a 3–Phase Boost DCM PFC Rectifier", Dec. 1996 VPEC Annual Seminar Proceedings, pp. 35–42.

*Primary Examiner*—Jeffrey Sterrett

[57] ABSTRACT

For use with a three-phase split boost converter having a primary stage with a primary rectifier and first and second primary boost switches coupled between an input and first and second outputs of the three-phase split boost converter, an auxiliary stage, method of reducing input current total harmonic distortion (THD) at the input of the three-phase split boost converter, and a three-phase split boost converter employing the auxiliary stage and method. In one embodiment, the auxiliary stage includes first, second and third auxiliary boost inductors coupled to corresponding phases of the input. The auxiliary stage also includes an auxiliary boost switch, interposed between the first, second and third auxiliary boost inductors and the first and second outputs of the split boost, that conducts to induce corresponding phase currents through the first, second and third auxiliary boost inductors thereby reducing input current THD at the input of the three-phase split boost converter.

23 Claims, 1 Drawing Sheet

“6,031,739”

TWO-STAGE, THREE-PHASE SPLIT BOOST CONVERTER WITH REDUCED TOTAL HARMONIC DISTORTION

TECHNICAL FIELD OF THE INVENTION

The present invention is directed, in general, to power conversion and, more specifically, to a three-phase split boost converter having a primary and auxiliary stage and a method of reducing total harmonic distortion (THD) at the input of the split boost converter.

BACKGROUND OF THE INVENTION

Poor input power factor and high input current total harmonic distortion (THD) generated by phase controlled and uncontrolled diode bridge rectifiers are well known problems in the power converter/rectifier industry. Low power factor and high THD commonly lead to input AC voltage distortions, AC distribution system losses, neutral harmonic currents, excitation of system resonances, and over-rated back-up alternator KVA ratings for telecommunication applications. To combat these problems, designers have attempted to develop improved three-phase rectifiers or converters which draw nearly sinusoidal line currents with low harmonic content and with high displacement power factor.

Boost converters are commonly used in power factor correction AC/DC rectifier applications as line conditioners. Typically, continuous conduction mode (CCM) boost converters are the topology of choice for providing a high regulated output voltage from substantially lower DC voltages derived from sinusoidal input voltages. The boost stage processes the AC input and develops a DC output voltage, typically 400 V or 800 V. The use of split boost converter topology in high input voltage conditions is particularly attractive because of several advantages, such as reduced boost inductor sizes, lower voltage rating switches and capacitors and higher efficiency.

A split boost topology provides two equal but unparallelable voltages from two output capacitors. Efficiency is achieved by limiting the lowest input voltage to a value of the voltage level of each of the two output voltages. The use of a split boost topology permits the use of power switching semiconductor devices rated as half the breakdown voltage required by a conventional power factor corrected boost stage, while still providing high power conversion efficiency. For example, with an intermediate DC bus voltage of only 400 V to the output high frequency isolated DC/DC bridge converters for a 480 Vac line input, readily available 600 V semiconductor switching devices and 450 V aluminum electrolytic energy storage capacitors can be used to design circuits, without compromising efficiency. The split boost converter scheme optimizes the use of power switches without compromising the advantages found in the three-level boost converter, such as a reduced boost inductor size.

Although the split boost converter scheme is advantageous, it does not solve the poor input power factor and high input total harmonic distortion (THD) problems implicit in three-phase high power rectification applications. For example, the input current drawn by the three-phase split-boost converter exhibits a non-sinusoidal wave-shape of a discontinuous 120° conduction type. An input current waveform of a three-phase, split boost converter while powering a heavy load is typically clipped and appears as a square wave, rather than a true sinusoid. Such low power factor and high THD commonly leads to input AC voltage distortions, distribution system losses, neutral harmonic currents and excitation of system resonances. In an effort to correct these problems, circuit designers have attempted to develop three-phase rectifiers or converters which draw nearly sinusoidal line currents with low harmonic content and high displacement power factor.

Recently, the power supply industry has become very cost sensitive, with low production cost being the key to success. Additionally, three-phase system THD requirements vary, with the international market THD requirement often being in the vicinity of 20%, as opposed to the domestic market which can accommodate THD of up to approximately 40%.

Accordingly, what is needed in the art is a cost effective three-phase split boost converter topology that achieves an increase in power factor and reduced input current THD.

SUMMARY OF THE INVENTION

To address the above-discussed deficiencies of the prior art, the present invention provides a design for use with a three-phase split boost converter having a primary boost stage with a primary rectifier and first and second primary boost switches coupled between an input and first and second outputs of the three-phase split boost converter, an auxiliary boost stage, method of reducing input current total harmonic distortion (THD) at the input of the three-phase split boost converter, and a three-phase split boost converter employing the auxiliary stage and method.

In one embodiment, the auxiliary stage includes first, second and third auxiliary boost inductors coupled to corresponding phases of the input. The auxiliary stage also includes an auxiliary boost switch, interposed between the first, second and third auxiliary boost inductors and the first and second outputs of the split boost converter, that conducts to induce corresponding phase currents through the first, second and third auxiliary boost inductors thereby reducing input current THD at the input of the three-phase split boost converter.

The present invention introduces the broad concept of employing an auxiliary boost stage in a three-phase split boost converter to reduce input current THD at the input of the converter. In addition to reducing input THD, the proposed three-phase split boost converter employing the invented auxiliary boost stage provides a satisfactory power factor. The auxiliary boost switch of the auxiliary stage occasionally conducts to provide substantially continuous currents in all three phases of the input to reduce the input current THD. The operation of the auxiliary stage provides additionally advantages such as reducing the current stresses on the active switches of the three-phase split boost converter.

In one embodiment of the present invention, the auxiliary boost switch transitions to a conducting state concurrently with the first and second primary boost switches. The auxiliary boost switch therefore may transition to a conducting stage at or near the time that the primary boost switches transition to a conducting state. In related but alternative embodiments, the auxiliary switch may transition to a non-conducting state concurrently or after the primary boost switches transition to a nonconducting state.

In one embodiment of the present invention, the auxiliary stage further includes an auxiliary rectifier coupled between the first, second and third auxiliary boost inductors and the auxiliary boost switch. In a related embodiment, the auxiliary stage further includes an auxiliary boost diode coupled between the auxiliary boost switch and the second output. In an advantageous embodiment of the present invention, the auxiliary stage further includes an energy storage and filtering capacitor coupled across the primary rectifier. In yet another related embodiment, the primary stage further includes a primary boost inductor and primary boost diode coupled between the first primary switch and the second primary switch.

In one embodiment of the present invention, the primary rectifier includes a six-diode bridge. Of course, any rectifier topology is well within the broad scope of the present invention.

In one embodiment of the present invention, the three-phase split boost converter further includes an input filter. In an embodiment to be illustrated and described, the input filter includes an inductor and capacitor network. Any filter, however, is well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
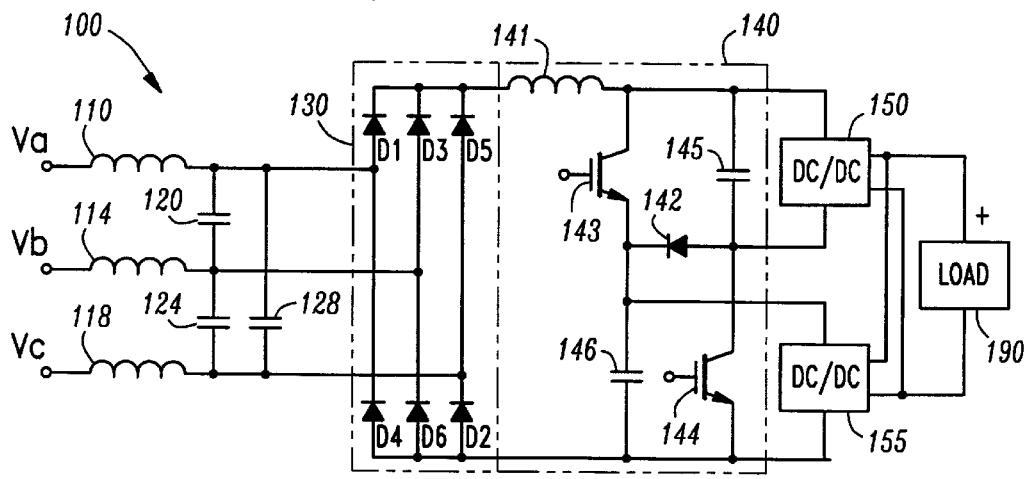
FIG. 1 illustrates a prior art three-phase split boost converter.

Referring initially to FIG. 1, illustrated is a schematic diagram of a prior art three-phase split boost converter. The three-phase split boost converter 100 receives input power from a AC voltage source in three phases Va, Vb, Vc. The illustrated embodiment employs an EMI filter by introducing Va, Vb, and Vc through first, second and third EMI filter inductors 110, 114, 118, respectively. A first filter capacitor 120 is coupled between the first and second EMI filter inductors 110, 114 and a second filter capacitor 124 is coupled between the second and third EMI filter inductors 114, 118. Finally, a third filter capacitor 128 is coupled between the first and third EMI filter inductors 110, 118. The EMI filter inductors 110, 114, 118 are also coupled to a three-phase diode bridge rectifier 130 that includes a plurality of diodes D1–D6 arranged in a full bridge configuration. The three-phase diode bridge rectifier 130 is further coupled to the split boost stage 140.

The split boost stage 140 is comprised of a main boost power inductor 141, a boost diode 142 that acts as a switch, two active switches 143, 144, and two output capacitors 145, 146. The output capacitors 145, 146 are relatively large and the voltages across them are essentially constant and equal during one switching cycle. The boost stage can supply two equal output loads. The loads from the two outputs can be subsequently combined in the isolated low voltage end. In the illustrated embodiment, the first output is supplied by output capacitor 146 and is coupled to high frequency, transformer isolated DC/DC converter 155. The second output is supplied by output capacitor 145 and is coupled to high frequency, transformer isolated DC/DC converter 150. The output of the two high frequency DC/DC converters 150, 155 are coupled to supply the load 140. Conventional control circuitry, which is not shown, drives the active switches 143, 144 simultaneously and is, therefore, not described herein.

The switches 143, 144 are closed and opened at the same time. When the switches 143, 144 are closed, the output capacitors 145, 146 are connected in parallel since the boost diode 142 is non-conducting in this mode. A current through the boost power inductor 141 increases linearly to store energy in the output capacitors 145, 146 and in the boost inductor 141. When the switches 143, 144 are open, the energy stored in the boost power inductor 141 is delivered to the load through the boost diode 142 and the now series combination of capacitors 145, 146. The output voltages across the output capacitors 145, 146 are maintained at an essentially equal level when the switches 143, 144 are closed and when the switches 143, 144 are opened by controlling two loads equally.

A detailed description of the operation of two-stage, three-phase split boost converters is disclosed in detail in U.S. Pat. No. 5,764,037, "HIGH EFFICIENCY BOOST TOPOLOGY WITH TWO OUTPUTS" to Jacobs and Farrington, and is incorporated herein by reference. Although the use of split boost converter topology in high input voltage conditions offers several advantages, its operation would be even more efficient and useful if the well known poor input power factor and high THD problems that exist in the power conversion business could be solved.

Figure 2:
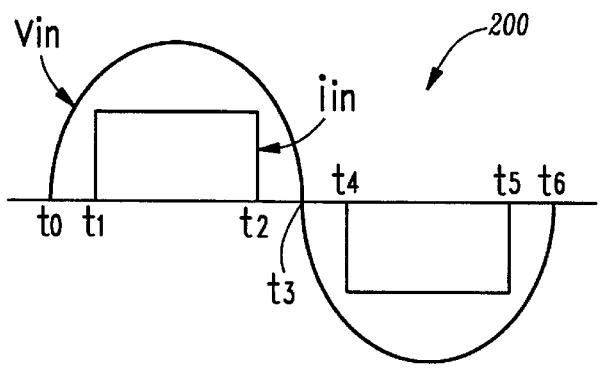
FIG. 2 illustrates an input voltage and current waveform for a prior art three-phase split boost converter.

Turning now to FIG. 2, illustrated is a typical input waveform for the prior art split-boost converter illustrated in FIG. 1. The input waveform 200 includes both an input voltage component Vin and an input current component Iin. The input voltage Vin is shown as a typical sinusoidal wave, whereas the input current Iin drawn by the three-phase split boost converter exhibits a non-sinusoidal wave-shape. The input current Iin appears as a clipped non-continuous 120 degree conduction type square wave. Preferably the input current Iin should appear as a sinusoidal wave with no phase shift from the input voltage Vin. Unfortunately, input line current harmonic distortion, or total harmonic distortion (THD), forces the input current Iin to be clipped into the present form, thus reducing the overall power factor. During four time segments of the line frequency cycle, namely, time segments t0–t1, t2–t3, t3–t4, t5–t6, there is zero current. The transitions during these time periods, from positive current to zero current to negative current to zero current, causes substantial current harmonics to be generated that impair the power supply system. By shaping the input current Iin into a sinusoidal-like form the zero-current time segments can be reduced or eliminated and current THD can be reduced.

Figure 3:
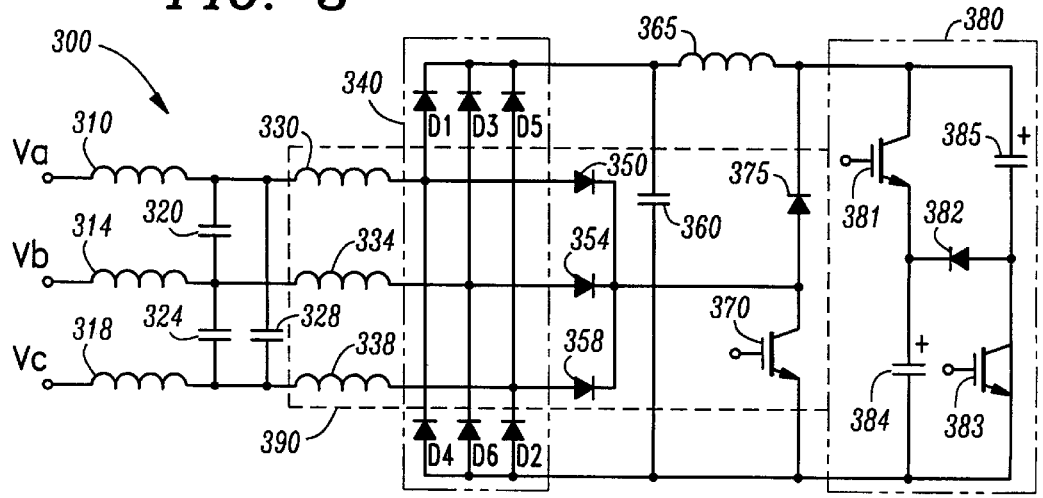
FIG. 3 illustrates a two-stage, three-phase split boost converter employing an embodiment constructed according to the principles of the present invention to provide low THD input.

Turning now to FIG. 3, illustrated is a two-stage, three-phase split boost converter employing an embodiment constructed according to the principles of the present invention to provide low THD input. Input power to the two-stage, three-phase split boost converter 300 is provided from an AC voltage source in three phases (illustrated as connected to phase voltages Va, Vb, Vc) through first, second and third EMI filter inductors 310, 314, 318, respectively. A first filter capacitor 320 is coupled between the first and second EMI filter inductors 310, 314 and a second filter capacitor 324 is coupled between the second and third EMI filter inductors 314, 318. Finally, a third filter capacitor 328 is coupled between the first and third EMI filter inductors 310, 318.

The first, second and third EMI filter inductors 310, 314, 318, together with the first, second and third filter capacitors 320, 324, 328, form an high frequency input filter.

In order to improve the input power factor and reduce THD an auxiliary boost stage 390 is added to the split boost circuit. The auxiliary stage 390 has first, second and third auxiliary boost inductors 330, 334, 338 coupled to the corresponding phases of the input power by being coupled to the first, second and third EMI filter inductors 310, 314, 318, respectively. The first, second and third auxiliary boost inductors 330, 334, 338 are also coupled to a six-diode bridge rectifier 340 that includes a plurality of diodes D1–D6 arranged in a full bridge configuration. Further, the auxiliary stage 390 has seventh, eighth and ninth input diodes 350, 354, 358 coupled to the first, second and third auxiliary boost inductors 330, 334, 338. The seventh, eighth and ninth input diodes 350, 354, 358 further comprise an auxiliary rectifier. In the auxiliary stage 390 the seventh, eighth and ninth input diodes 350, 354, 358 are coupled to an auxiliary boost switch 370 and an auxiliary boost diode 375. The auxiliary stage 390 has an energy storage capacitor 360 that is coupled across the rectified DC bus.

The primary boost inductor 365 of the split boost converter is coupled to the bridge rectifier 340, the split-boost converter primary stage 380 and the auxiliary boost diode 375. The auxiliary boost switch 370 and the auxiliary boost diode 375 are coupled to the primary stage 380 across the rectified DC bus.

The primary stage 380 of the split boost converter is analogous to the circuitry described in FIG. 1. The primary stage 380 is includes a primary boost diode 382 that acts as a switch, a first and second primary boost switches 381, 383, and two output capacitors 384, 385. The output of the primary stage 380, which is not shown, is taken across output capacitors 384, 385 and may be subsequently combined through high frequency isolated DC/DC converters. The primary boost diode 382 and the first and second primary boost switches 381, 385 are coupled between the input to the primary stage 380 and the first and second outputs (not shown) are taken across output capacitors 384, 385. Another embodiment of the current invention would include first and second output filters across the first and second outputs, respectively, of the primary stage 380.

The auxiliary boost stage 390 circuitry functions to decrease THD during the time segments when there is zero current in FIG. 2 (i.e., time segments t0–t1, t2–t3, t3–t4, t5–t6) by drawing current in an attempt to shape the input current Iin into a sinusoidal form. When the auxiliary boost switch 370, interposed D between the first, second, and third auxiliary boost inductors 330, 334, 338 and the first and second outputs to the primary stage 380, is turned on the three auxiliary boost inductors 330, 334, 338 are shorted. When the auxiliary boost switch 370 is engaged corresponding phase currents through the three auxiliary boost inductors 330, 334, 338 is induced. The currents within these three inductors 330, 334, 338 will be distributed based on the three-phase input sinusoidal wave source. Therefore, input THD is reduced.

The operation of three-phase split boost converter 300 with an auxiliary boost stage may be illustratively described in terms of the duty cycle of the switches 370, 381, 383. The auxiliary boost switch 370 always turns-on (conducts) concurrently with the first and second primary boost switches 381, 383. If the duty cycle of the auxiliary boost switch 370 is D2 and the duty cycle of the first and second primary boost switches 381, 383 is D1, then it is necessary that D2 be at least equal to or greater than D1. The simplest control methodology is to have D2 equal to D1; however D2 can be greater than D1 as long as all active switches 370, 381, 383 are turned on at the same time and D2 is equal to or greater than D1. Otherwise, the auxiliary boost diode 375 would be a high blocking voltage diode or the first and second primary boost switches 381, 383 would be forced to turn off in order to control the primary stage 380 output capacitors 384, 385.

Continuing the illustrative example, the duty cycles of the three active switches 370, 381, 383, are the same and all three are switched between conductive and non-conductive states synchronously. When all of the switches 370, 381, 383 are turned on at the same time, the entire converter circuit can be divided into two parts. The first part is the split boost converter that is powered by a energy storage capacitor 360. Since the voltage across the energy storage capacitor 360 is higher than that of the first and second output capacitors 384, 385 in parallel, the current in the primary boost inductor 365 starts to increase linearly. Energy stored in the capacitor 360 is transferred to the inductor 365 and the output loads (not shown). During this time period, the voltage across the capacitors 384, 385 is nearly constant.

The second part of the circuit is formed by the auxiliary stage. The three auxiliary boost inductors 330, 334, 338 are shorted by the auxiliary boost switch 370 via the half-wave rectifier comprised by the seventh, eighth and ninth input diodes 350, 354, 358. The currents in the auxiliary boost inductors 330, 334, 338 will start to build up. Also, since the auxiliary inductors are equal in values, the currents within the inductors will be distributed in relation to the three-phase input voltages. The peak currents of the auxiliary inductors are substantially sinusoidal during the input AC line cycle.

All three active switches 370, 381, 383 are turned off simultaneously after a specified time interval DTs, where D is the switch duty cycle and Ts is the switching time period. The duty cycle D is determined by the voltage and/or current regulation loop of the converter 300. Once the switches are turned off, the current in the main split boost starts to flow through the series connected output capacitors 384, 385 via the primary boost diode 382. As a result of the high output voltage (approximately twice the individual output voltages), the boost inductor current will decrease. Meanwhile, the energy stored in the auxiliary boost inductors needs to be released and will start to charge the energy storage capacitor 360. Once the voltage across the energy storage capacitor 360 is charged to the sum of the two output voltages, the auxiliary boost diode 375 will conduct. At this time, the voltage across the primary boost inductor 365 is clamped at zero voltage. Thus, the current in the inductor stays substantially flat and unchanged. This period ends when the current flowing through the auxiliary boost diode 375 reaches zero. At that point, the auxiliary boost diode 375 is reverse biased and is therefore turned off. The input power is delivered to the output loads through the six-diode bridge rectifier 340, the primary boost inductor 365 and the split boost converter 380 until the next switching cycle begins.

While specific embodiments of a power converter and a method of reducing input current THD have been illustrated and described, other embodiments are well within the broad scope of the present invention. For a better understanding of switching power supplies, in general, see "Principles of Power Electronics" by John G. Kassakian, et al., Addison Wesley, Inc. (1991), and for split boost topologies, see, "An Improved High Efficiency Rectifier for Telecom Applications" by M. E. Jacobs, et al., pp.530–535, 1996 IEEE INTELEC Proceedings (1996), "An Active Power Factor Correction Technique for Three-Phase Diode Rectifiers" by A. R. Prasad, et al., pp.58–66, 1989 IEEE PESC Proceedings (1989) and "Optimum PWM Pattern for A 3-Phase Boost DCM PFC rectifier" by R. Zhang & F. C. Lee, pp.35–42, 1996 VPEC Annual Seminar Proceeding (1996), which are incorporated herein by reference.

Although the present invention has been described in detail, those skilled in the art should understand that they can make various changes, substitutions and alterations herein without departing from the spirit and scope of the invention in its broadest form.

What is claimed is:

1. For use with a three-phase split boost converter having a primary stage, including a primary rectifier and first and second primary boost switches, coupled between an input and first and second outputs of said three-phase split boost converter, an auxiliary stage, comprising:
    first, second and third auxiliary boost inductors coupled to corresponding phases of said input; and
    an auxiliary boost switch, interposed between said first, second and third auxiliary boost inductors and said primary stage, that conducts during at least a portion of a conduction period of said first and second primary boost switches to induce corresponding phase currents through said first, second and third auxiliary boost inductors thereby reducing input current total harmonic distortion (THD) at said input of said three-phase split boost converter.

2. The auxiliary stage as recited in claim 1 wherein said auxiliary boost switch transitions to a conducting state concurrently with said first and second primary boost switches.

3. The auxiliary stage as recited in claim 1 further comprising an auxiliary rectifier coupled between said first, second and third auxiliary boost inductors and said auxiliary boost switch.

4. The auxiliary stage as recited in claim 1 further comprising an auxiliary boost diode coupled between said auxiliary boost switch and said second output.

5. The auxiliary stage as recited in claim 1 wherein said primary rectifier comprises a six-diode bridge.

6. The auxiliary stage as recited in claim 1 wherein said primary stage further comprises a primary boost inductor and primary boost diode.

7. The auxiliary stage as recited in claim 1 wherein said three-phase split boost converter further includes an input filter.

8. The auxiliary stage as recited in claim 1 further comprising an energy storage and filtering capacitor coupled across said primary rectifier.

9. For use with a three-phase split boost converter having a primary stage, including a primary rectifier and first and second primary boost switches, coupled between an input and first and second outputs of said three-phase split boost converter, a method of reducing input current total harmonic distortion (THD) at said input of said three-phase split boost converter, comprising:
    coupling first, second and third auxiliary boost inductors of an auxiliary stage to corresponding phases of said input; and
    interposing an auxiliary boost switch of said auxiliary stage between said first, second and third auxiliary boost inductors and said primary stage; and
    controlling said auxiliary boost switch to conduct during at least a portion of a conduction period of said first and second primary boost switches to induce corresponding phase currents through said first, second and third auxiliary boost inductors thereby reducing said input current THD.

10. The method as recited in claim 9 wherein said controlling comprises transitioning said auxiliary boost switch to a conducting state concurrently with said first and second primary boost switches.

11. The method as recited in claim 9 further comprising coupling an auxiliary rectifier of said auxiliary stage between said first, second and third auxiliary boost inductors and said auxiliary boost switch.

12. The method as recited in claim 9 further comprising coupling an auxiliary boost diode of said auxiliary stage between said auxiliary boost switch and said second output.

13. The method as recited in claim 9 wherein said primary rectifier comprises a six-diode bridge.

14. The method as recited in claim 9 further comprising filtering an input voltage of said three-phase split boost converter.

15. The method as recited in claim 9 further comprising coupling an energy storage and filtering capacitor across said primary rectifier.

16. A three-phase split boost converter having an input and first and second outputs, comprising:
    a primary stage, including a primary rectifier coupled to said input and first and second primary boost switches, coupled to said first and second outputs;
    an auxiliary stage, including:
        first, second and third auxiliary boost inductors coupled to corresponding phases of said input; and
        an auxiliary boost switch, interposed between said first, second and third auxiliary boost inductors and said primary stage, that conducts during at least a portion of a conduction period of said first and second primary boost switches to induce corresponding phase currents through said first, second and third auxiliary boost inductors thereby reducing input current total harmonic distortion (THD) at said input of said three-phase split boost converter; and
    a first and second output filters coupled across said first and second outputs, respectively, of said three-phase split boost converter.

17. The three-phase split boost converter as recited in claim 16 wherein said auxiliary boost switch transitions to a conducting state concurrently with said first and second primary boost switches.

18. The three-phase split boost converter as recited in claim 16 wherein said auxiliary stage further comprises an auxiliary rectifier coupled between said first, second and third auxiliary boost inductors and said auxiliary boost switch.

19. The three-phase split boost converter as recited in claim 16 wherein said auxiliary stage further comprises an auxiliary boost diode coupled between said auxiliary boost switch and said second output.

20. The three-phase split boost converter as recited in claim 16 wherein said primary rectifier comprises a six-diode bridge.

21. The three-phase split boost converter as recited in claim 16 wherein said primary stage further comprises a primary boost inductor and primary boost diode.

22. The three-phase split boost converter as recited in claim 16 further comprising an input filter.

23. The three-phase split boost converter as recited in claim 16 further comprising an energy storage and filtering capacitor coupled across said primary rectifier.

* * * * *